(12) United States Patent
Chen

(10) Patent No.: US 7,600,555 B2
(45) Date of Patent: Oct. 13, 2009

(54) SUNSHADE FOR VEHICLES

(76) Inventor: Wen-Ho Chen, No. 198, Hsishih Rd., Yungkang City, Tainan Hsien (TW)

( * ) Notice: Subject to any disclaimer, the term of this patent is extended or adjusted under 35 U.S.C. 154(b) by 265 days.

(21) Appl. No.: 11/781,765

(22) Filed: Jul. 23, 2007

(65) Prior Publication Data

US 2009/0025890 A1    Jan. 29, 2009

(51) Int. Cl.
   *B60J 1/20*   (2006.01)
(52) U.S. Cl. .................... 160/370.23; 160/34
(58) Field of Classification Search ............ 160/370.23, 160/84.02, 84.04, 84.05, 84.06, 32, 34; 296/97.8
   See application file for complete search history.

(56) References Cited

U.S. PATENT DOCUMENTS

| | | | | | |
|---|---|---|---|---|---|
| 1,548,523 | A | * | 8/1925 | Friend | 160/191 |
| 4,212,341 | A | * | 7/1980 | Fisher | 160/84.04 |
| 5,067,541 | A | * | 11/1991 | Coslett | 160/84.04 |
| 5,170,830 | A | * | 12/1992 | Coslett | 160/84.04 |
| 5,477,904 | A | * | 12/1995 | Yang | 160/370.23 |
| 5,937,929 | A | * | 8/1999 | Chen | 160/370.23 |
| 2009/0025890 | A1 | * | 1/2009 | Chen | 160/370.21 |

* cited by examiner

*Primary Examiner*—Blair M. Johnson
(74) *Attorney, Agent, or Firm*—patenttm.us

(57) ABSTRACT

A sunshade for vehicle has a blind and at an operating device. The blind has multiple panels pivotally connected to each other for covering a window of the vehicle. The operating device is mounted adjacent to the window of the vehicle and comprises a base, a cover and a winding assembly. The base and the cover are mounted to each other using clips and corresponding notches engaging each other to provide a strong connection. The winding assembly has two shafts mounted securely between the cover and the base, a resilient element mounted securely around each shaft and a drive wheel mounted rotatably on each shaft and connected with the resilient element to provide the recoiling force. The structure of the sunshade is simple and therefore is easily assembled, whilst internal structures are robust to prevent breakage and vibration.

10 Claims, 7 Drawing Sheets

US 7,600,555 B2

SUNSHADE FOR VEHICLES

BACKGROUND OF THE INVENTION

1. Field of the Invention

The present invention relates to a sunshade, and more particularly to a sunshade for vehicle that is simple, easily manufactured and robust.

2. Description of Related Art

Sunshades are mounted on windows, especially on vehicles for blocking or filtering sunshine or external electromagnetic waves that cause temperature inside the vehicle to rise.

Presently, sunshades for vehicles include a blind and an operating device.

The blind comprises multiple panels pivotally connected adjacently to each other and having a stationary panel and an attaching panel. Each panel has an upper end and a lower end slidably mounted on a guide and can fold or unfold along the guide to cover the window of the vehicle. Wherein the attaching panel has a retainer to hold the blind in position.

With reference to FIG. 7, the operating device (40) is mounted on the window of the vehicle and is attached to the stationary panel to provide a recoiling force to make the blind fold automatically, and comprises a base (41), a cover (42), two drive wheels (43) and two resilient wheels (44).

The base (41) has a mounting board (410) and a main board (420). The main board (420) is mounted perpendicularly to the side board (410) and has an upper end, a lower end, two through holes (421), an inner surface and four shafts (422) separately formed on and protruding perpendicularly from the inner surface of the main board (420) between the through holes (421) and each shaft (422) has a central hole (423).

The cover (42) has an inner surface and four pins (420) separately formed on and protruding perpendicularly from the inner surface of the cover (42). Each pin (420) corresponds to and is mounted in the central hole (423) of the corresponding shaft (422) to secure the cover (42) relative to the base (41).

The drive wheels (43) are rotatably mounted respectively around the two shafts (422) that near the two ends of the main board (420). Each drive wheel (43) has a recess (430), a groove (431) and a cable. The cable is wound around the groove (431) of the drive wheel (43) and extends through the corresponding through hole (421) and is connected to the blind such that the drive wheel (43) rotates when the blind is unfolded.

The resilient wheels (44) are respectively mounted rotatably around the two shafts (422) between the drive wheels (43). Each resilient wheel (44) has a groove and a resilient coil (440). The resilient coil (440) may be a metallic strip, is wound around the groove of the resilient wheel (44) and has an end mounted securely in the recess (430) of the adjacent drive wheel (43), such that the resilient coil (440) is wound over the drive wheel (43) as the drive wheel (43) rotates to provide a recoiling force, allowing the blind to fold automatically.

However, manufacture of conventional sunshades is time-consuming and inefficient, because the structure is complex and assembly of the resilient wheels (44) and the drive wheels (43) is awkward since the resilient coils (440) may spring and obstruct the ends being secured into the recesses (430), these problems further make the operating device flimsy.

Additionally, the connection between the base (41) and the cover (42), specifically, between the pins (420) and the shafts (422) is weak.

To overcome the shortcomings, the present invention provides a sunshade to obviate or mitigate the aforementioned problems.

SUMMARY OF THE INVENTION

The main objective of present invention is to provide a sunshade for a vehicle that is simple, easily manufactured and robust.

To achieve the objective, the sunshade in accordance with present invention is mounted adjacent to a window of the vehicle and comprises blind and an operating device.

The blind comprises multiple panels pivotally connected to each other. The operating device is mounted adjacent to the window of the vehicle and comprises a base, a cover and a winding assembly. The base and the cover are mounted to each other using clips and corresponding notches engaging each other to provide a strong connection.

The winding assembly comprises at least one shafts mounted securely between the cover and the base, at least one resilient element mounted securely around each shaft and at least one drive wheel mounted rotatably on each shaft. The drive wheel is connected to the resilient element and has a cable wound around the drive wheel and extending through the base further connected to the blind. The drive wheel rotates when the blind is unfolded to twist the resilient element. Therefore, once the retainer is released, the blind will fold automatically.

Accordingly, the structure of the sunshade is simple, easily manufactured and is robust to prevent breakage and vibration.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
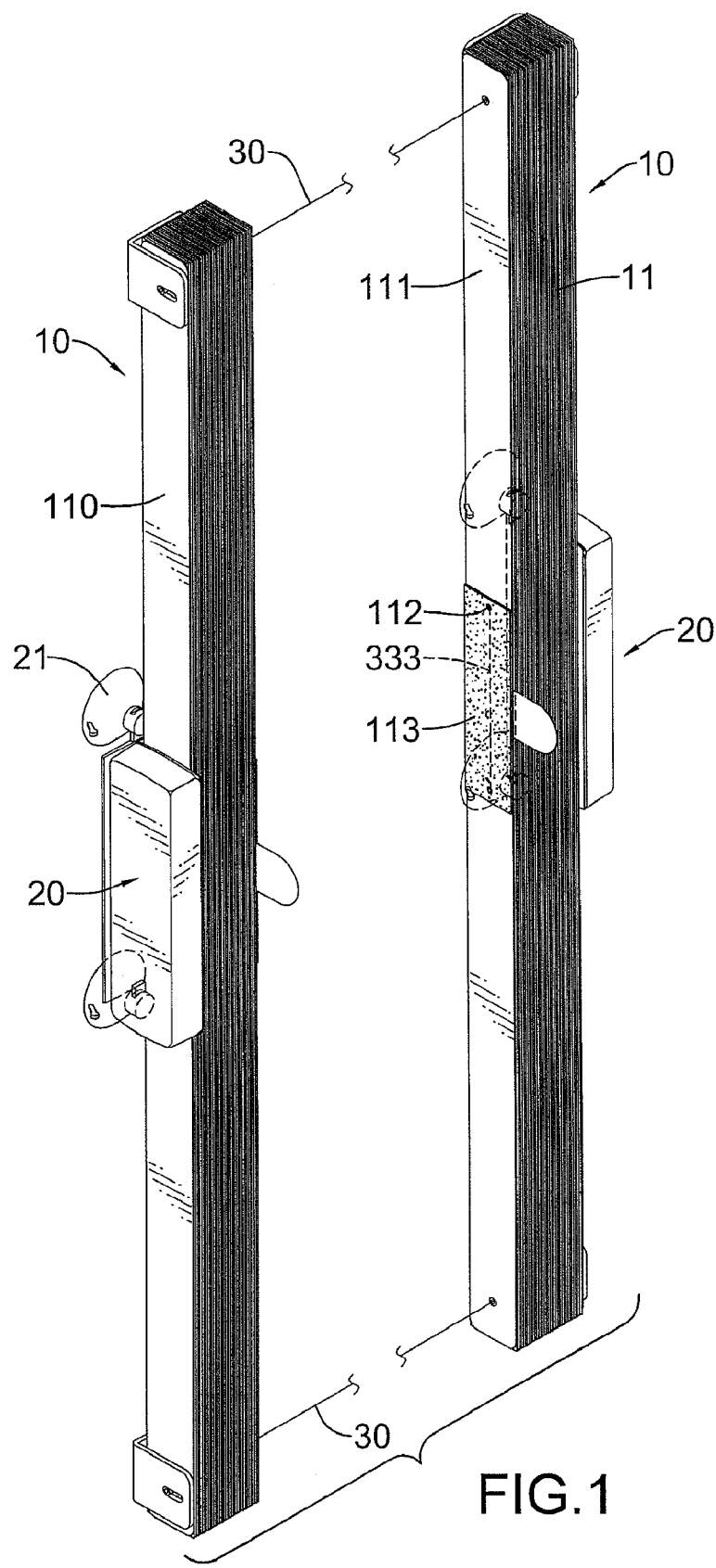
FIG. 1 is a perspective view of two sunshades in accordance with the present invention.
Figure 5:
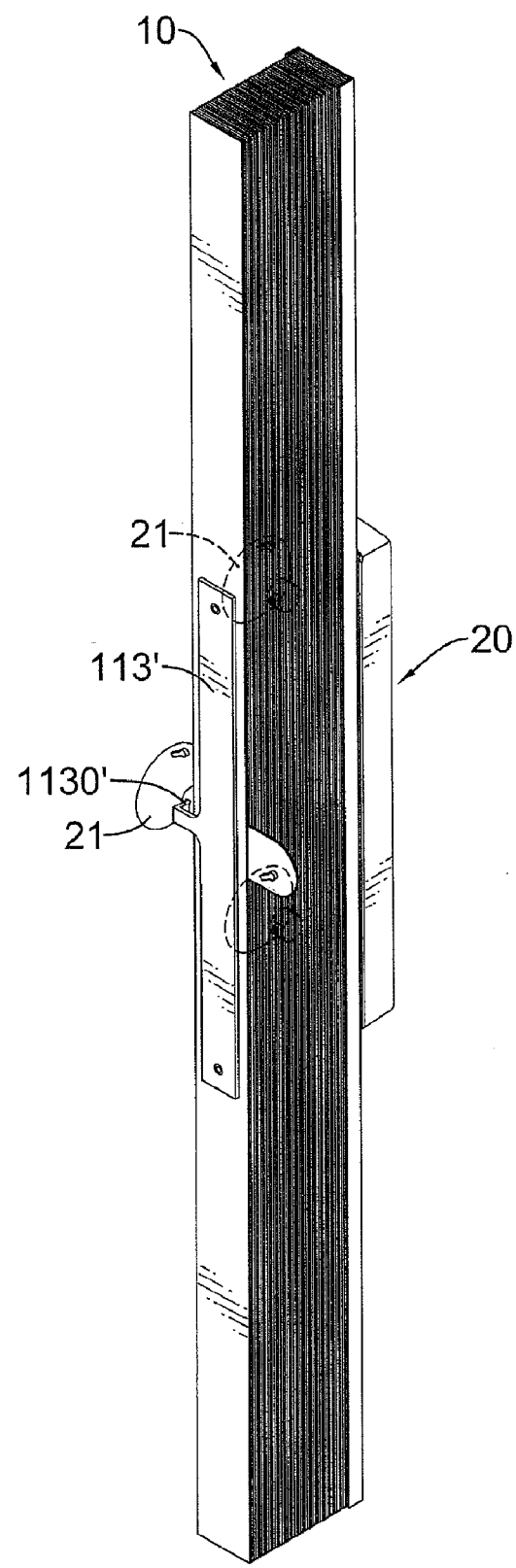
FIG. 5 is a perspective view of a second embodiment of the sunshade in accordance with the present invention, with suction disks shown in phantom lines.

With reference to FIGS. 1 and 5, a sunshade for a vehicle in accordance with present invention is mounted onto a window of the vehicle and comprises a blind (10) and an operating device (20). Two sunshades may be mounted opposite to each other for added convenience.

The blind (10) comprises two optional guides (30) and multiple panels (11). The guides (30) are mounted parallelly to each other. The panels (11) may be mounted on the guides (30), are pivotally connected adjacent to each other and include a stationary panel (110) and an attaching panel (111). Each panel (11) has two middle holes (112), and two optional guide holes corresponding to and respectively mounted slidably around the guides (30), wherein the attaching panel (111) is attached to the guides (30). Therefore, the panel (11) can move stably along the guides (30) when being folded or unfolded.

Figure 6:
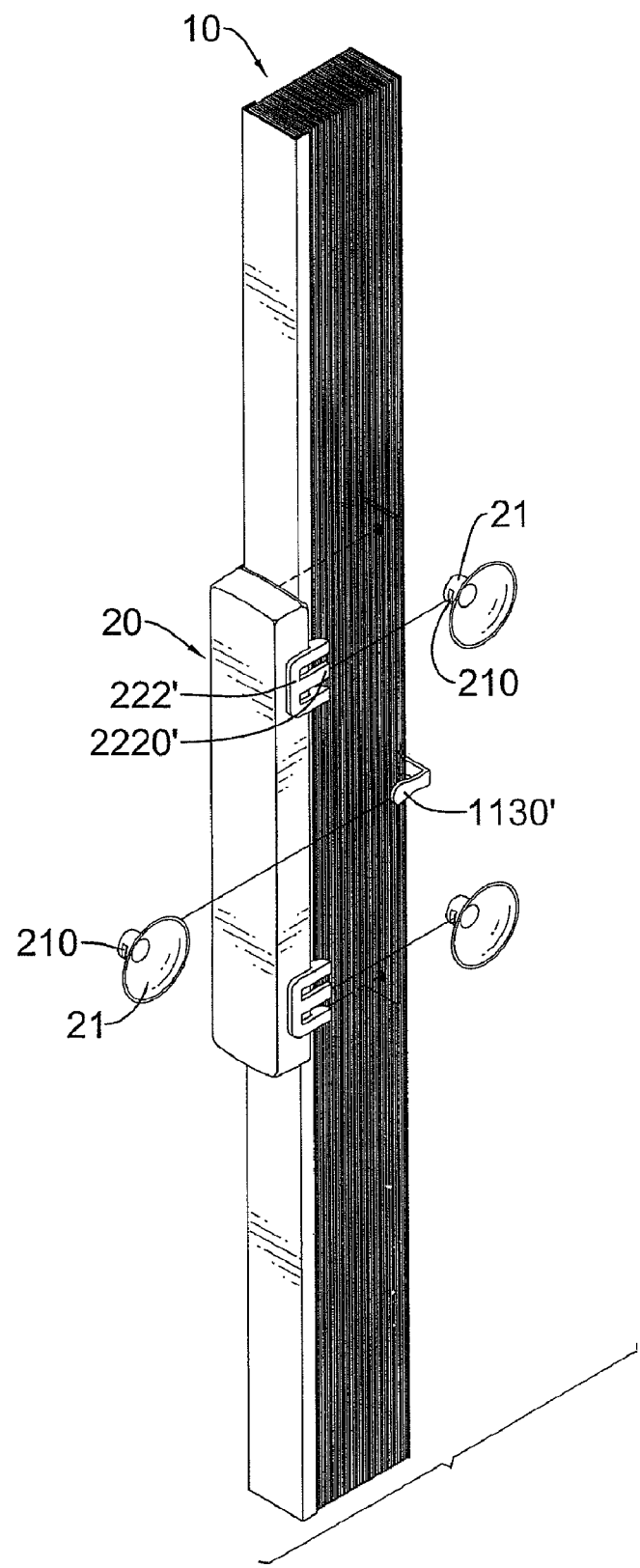
FIG. 6 is an exploded rear perspective view of the sunshade in FIG. 5.
Figure 7:
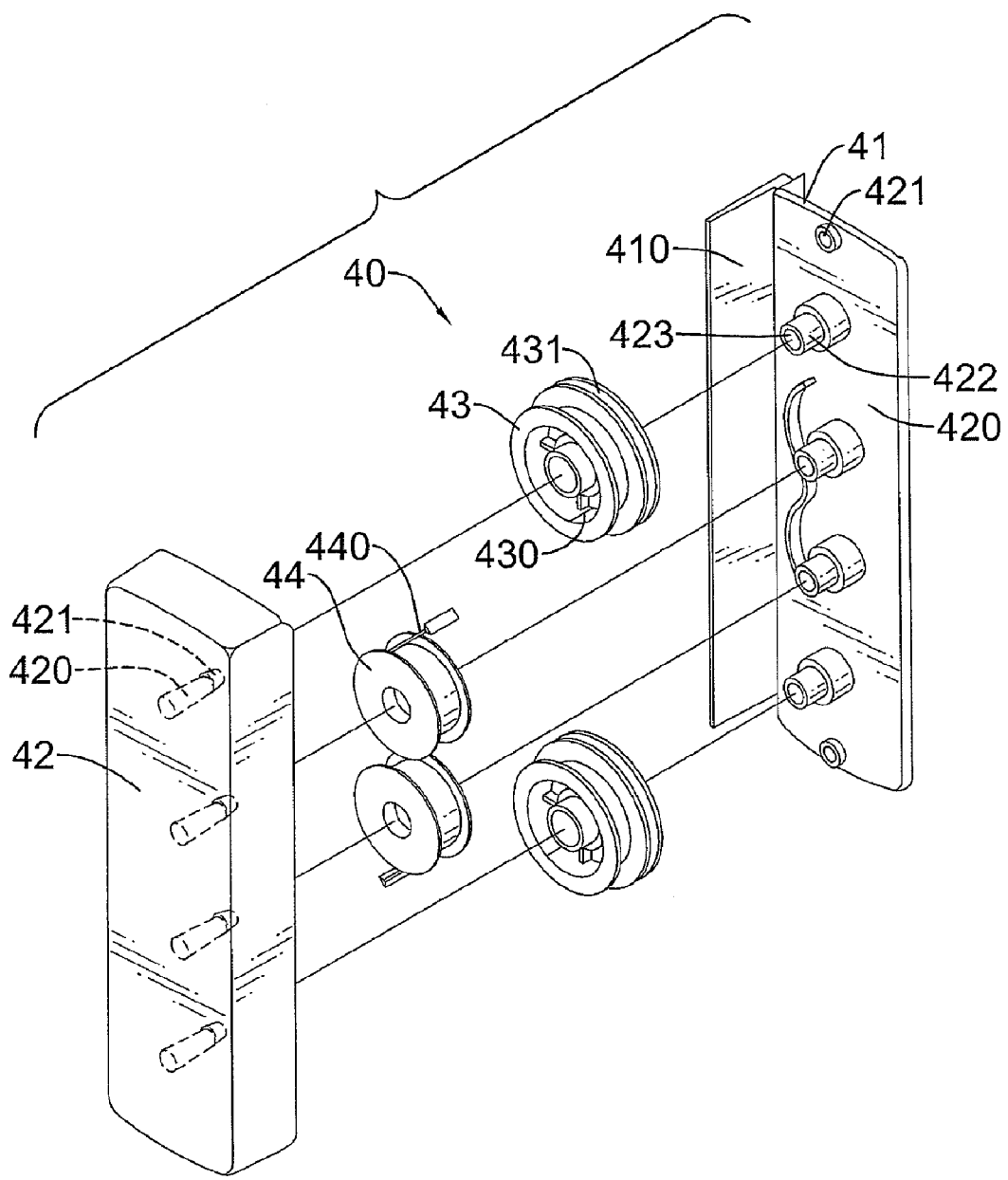
FIG. 7 is an exploded perspective view of a conventional operating device in accordance with prior art.

With further reference to FIGS. 5 and 6, the attaching panel (111) has a retainer (113, 113'). The retainer (113, 113') is formed on the attaching panel (111) corresponding to and mounted detachably to the retainer mount. The retainer (113, 113') may use one of many conventional methods, such as a hook (1130'), a magnetic strip, multiple plastic hooks or such like. The hook (1130') is formed on and protrudes from the retainer (113') and is mounted with a suction disk (21) that detachably mounts to the window. The retainer mount is correspondingly mounted opposite to the retainer (113, 113') and adjacent to the window, and may be a magnetic strip, a recess, multiple plastic loops corresponding to and interlocking with the multiple hooks or a retainer (113, 113') of the other blind (10), the retainer mount may be formed on a suction disk, or integrated into a window frame.

Figure 2:
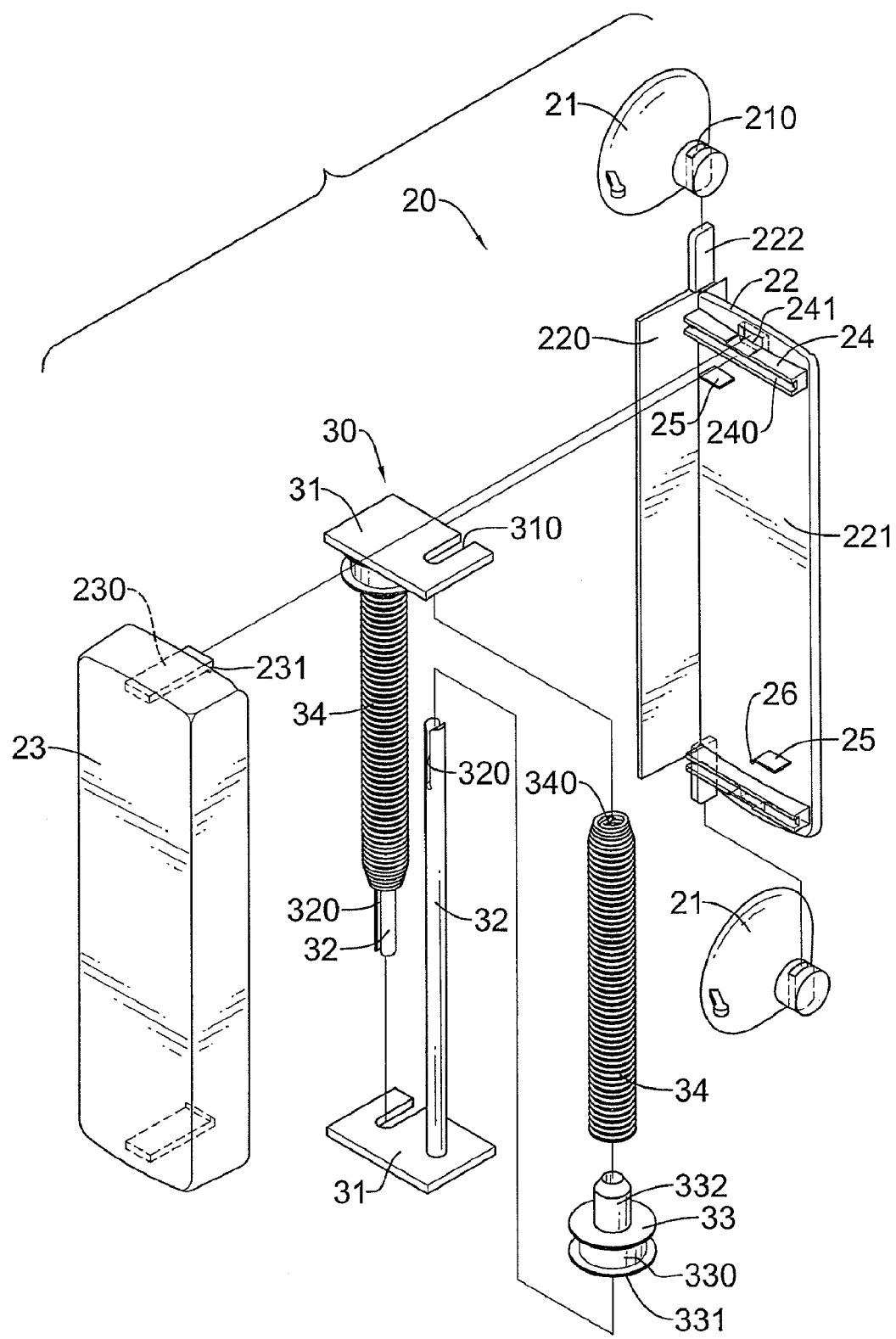
FIG. 2 is an exploded perspective view of an operating device of the sunshade in FIG. 1.
Figure 3:
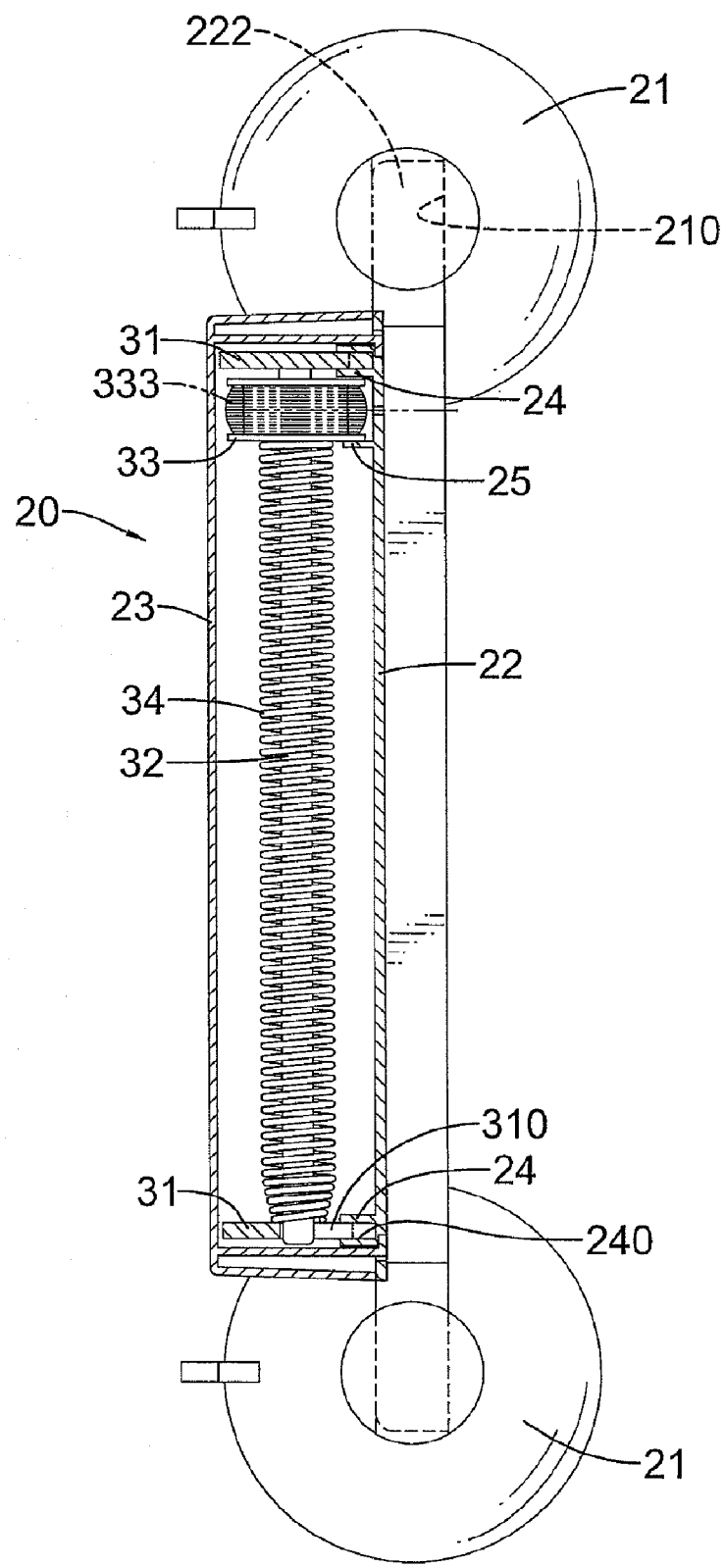
FIG. 3 is a front view in partial section of the operating device in FIG. 2.

With further reference to FIGS. 2 and 3, the operating device (20) is mounted adjacent to the window of the vehicle and is attached securely to the stationary panel (110) of the blind (10) and comprises multiple fasteners, a base (22), a cover (23) and a winding assembly (30).

The fasteners hold the operating device (20) adjacent to the window and may be suction disks (21) mounted detachably on the window of the vehicle, and each suction disk (21) has a transverse hole (210).

With further reference to FIG. 6, the base (22) has a mounting board (220) and a main board (221). The mounting board (220) has two ends and two connectors (222, 222'). The connectors (222, 222') are formed respectively on the ends of the mounting board and may protrude from the ends of the mounting board (220) and are mounted respectively on the suction disks (21), may correspond to the transverse hole (210) of the suction disks (21), so as to hold the operating device (20) adjacent to the window.

The main board (221) is formed perpendicularly on the side board (220) and has two ends, an inner surface, at least two board mounts (24), at least two tabs (25) and at least two through holes (26).

The board mounts (24) are formed respectively at each end on the inner surface of the main board (221) parallel to each other and each board mount (24) has a longitudinal groove (240) and a notch (241) formed adjacent to the longitudinal groove (240).

The tabs (25) are formed on and protrude from the inner surface of the main board (221) near the board mounts (24).

The through holes (26) are formed through the main board (221) respectively adjacent to each tab (25).

The cover (23) is a container, is mounted securely on the base and has two ends and two clips (230). The clips (230) are formed respectively at the ends of the cover and correspond to and are mounted in the notches (241) of the board mounts (24) to mount the cover (23) securely on the base (22).

The winding assembly (30) is mounted on the base (22) and comprises two mounting boards (31), two shafts (32), two drive wheels (33) and two resilient elements (34).

The mounting boards (31) are respectively mounted securely in the grooves (240) of the board mounts (24) on the base (22), and each mounting board (31) has a recess (310) and an inner surface.

Figure 4:
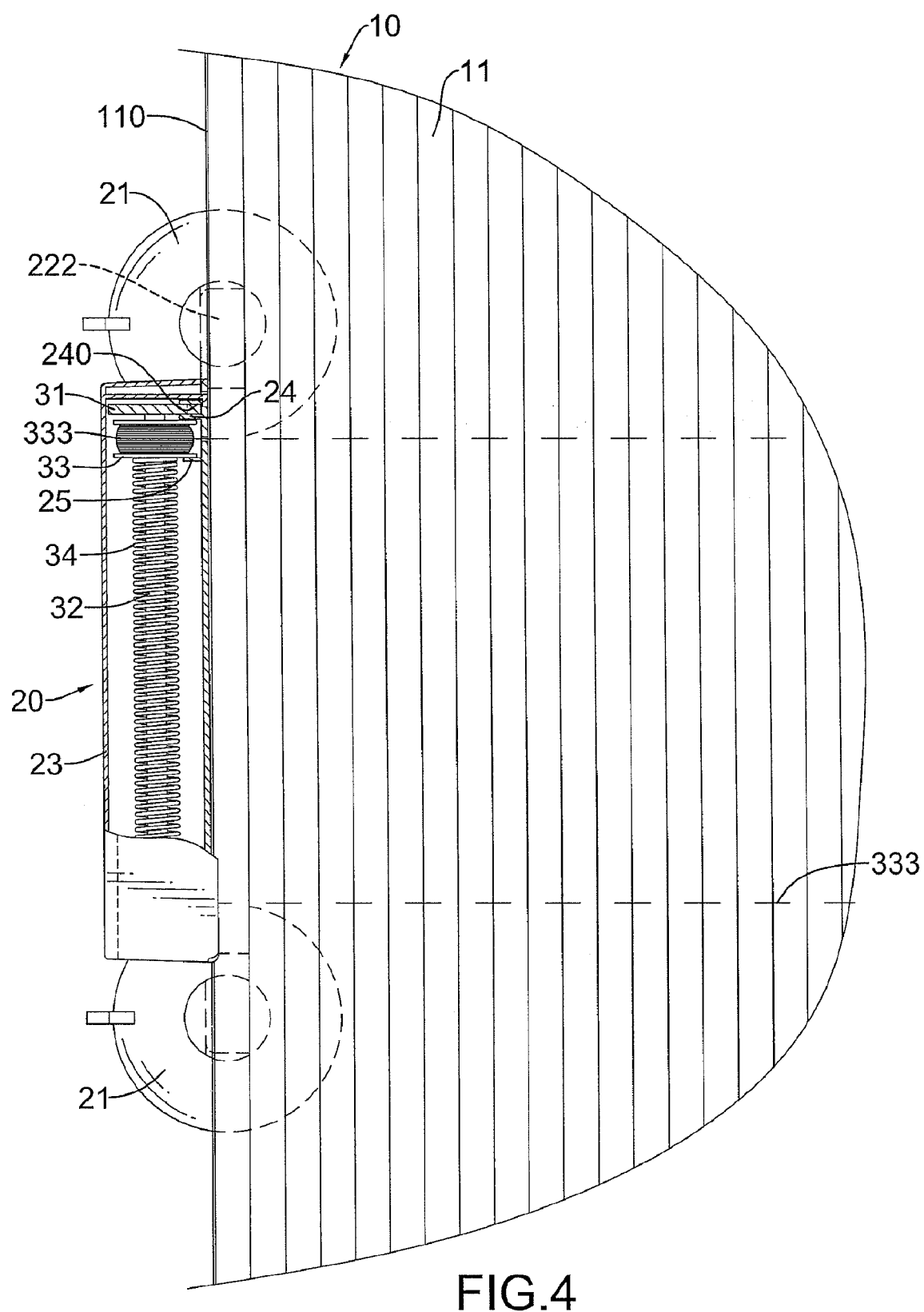
FIG. 4 is an enlarged front view in partial section of the sunshade in FIG. 2, shown open.

The shafts (32) are mounted respectively on and protrude perpendicularly from the inner surfaces of the mounting boards (31) adjacent to the recesses (310). Each shaft (32) has a distal end and an optional slit (320). The distal end of each shaft (32) is mounted in the recess of the other mounting board (31). Each slit (320) is formed longitudinally in the distal end of each shaft (32). With further reference to FIG. 4, the drive wheels (33) are respectively mounted rotatably around the corresponding shaft (32), and each drive wheel (33) has a circumference, a groove (330), a connecting portion (332) and a cable (333). The groove (330) is formed around the circumference of the drive wheel (33). The cable is (333) is wound around the drive wheel (33), may be in the groove (330) and extends through the through hole (26) of the base (22) and the middle holes (112) of the panels (11) and connects to the other drive wheel's (33) cable (333). Therefore, the drive wheels (33) rotate synchronously when the blind (10) is unfolded.

The resilient elements (34) may be coil springs and are mounted respectively around the shafts (32), and each resilient element (34) is connected securely between the connecting portion (332) of the adjacent drive wheel (33) and to the distal end of the shaft (32), may be mounted in the slit (320) of the shaft (32). When the blind is opened, the resilient element (34) is twisted by the drive wheel (33) and provides a recoiling force.

With further reference to FIGS. 5 and 6, In a second embodiment of present invention, the retainer (113') has a transversal mounting portion (1130') extending through the transversal hole (210) of a suction disk (21) to hold the position of the blind (10) on the window via the suction disks (21). Besides, the connectors (222') are separately formed integrally on the inner side of the cover (23), and each connector (222') has a protrusion (2220') extending through the transversal hole (210) of a suction disk (21) to attach the suction disk (21) onto the connector (222').

When the retainer (113) is released, the resilient elements (34) provide a recoiling force to the drive wheels (33) to rotate and draw back the cables (333), causing the panels (11) to fold automatically.

Accordingly, the structure of the sunshade in accordance with present invention is simple and easily assembled, therefore manufacture of the sunshade is fast and easy.

Additionally, the connection between the base (22) and the cover (23) is firm and because the mounting boards (31) are mounted securely in the board mounts (24), and the drive wheels (33) are supported by the tabs (25) the operating device is robust. Moreover, the drive wheels (33) rotate stably, limiting shake or vibration whilst the blind (10) is being folded or unfolded.

Even though numerous characteristics and advantages of the present invention have been set forth in the foregoing description together with details of the structure and function of the invention, the disclosure is illustrative only. Changes may be made in detail especially in matters of shape, size and arrangement of parts within the principles of the invention to the full extent indicated by the broad general meaning of the terms in which the appended claims are expressed.

What is claimed is:

1. A sunshade for vehicle comprising
a blind having
multiple panels being pivotally connected adjacent to each other and each panel having at least two middle holes and the multiple panels including
a stationary panel; and
an attaching panel having a retainer formed on the attaching panel;
an operating device being attached securely to the stationary panel of the blind and comprising
multiple fasteners;
a base having a mounting board having
two ends; and
two connectors being formed respectively on the ends of the mounting board and connected to the fasteners; and
a main board being formed perpendicularly on the mounting board and having
two ends;
an inner surface;
at least two board mounts being formed respectively on the inner surface of the main board parallel to each other, and each board mount having a longitudinal groove;
at least two tabs being formed on and protruding from the inner surface of the main board near the board mounts; and
at least two through holes being formed through the main board respectively adjacent to the tabs;
a cover being mounted securely on the base and having two ends; and
a winding assembly being mounted inside on the base and comprising
two mounting boards being respectively mounted securely in the grooves of the board mounts on the base, and each mounting board having a recess and an inner surface;
two shafts being mounted respectively on and protruding perpendicularly from the inner surfaces of the mounting boards adjacent to the corresponding recesses and each shaft having a distal end being mounted in the recess of the other mounting board;
two drive wheels being respectively mounted rotatably around the corresponding shafts, and each drive wheel having
a circumference;
a connecting portion; and
a cable being wound around the circumference of the drive wheel and extending through one of the through holes of the base and the middle holes of the panels and connecting with the other drive wheel's cable; and
two resilient elements being mounted respectively around the shafts, and each resilient element being connected securely between the connecting portion of an adjacent drive wheel and the distal end of a corresponding shaft.

2. The sunshade as claimed in claim 1, wherein
each board mount of the main board further has a notch formed adjacent to the longitudinal groove;
the cover further has two clips being formed respectively at the ends of the cover, corresponding to and being mounted in the notches of the board mounts.

3. The sunshade as claimed in claim 1, wherein
each shaft further has a slit formed longitudinally in the distal end; and
one end of each resilient element is further mounted in the slit of a corresponding shaft.

4. The sunshade as claimed in claim 1, wherein
the fasteners are suction disks, and each suction disk has a transversal hole; and
the connectors protrude from the mounting board and are mounted respectively in the transverse holes of the suction disks.

5. The sunshade as claimed in claim 1, wherein
the drive wheel further comprises a groove formed around the circumference of the drive wheel; and
each cable is wound around the groove in a corresponding drive wheel.

6. The sunshade as claimed in claim 1, wherein
the blind further comprises two guides mounted parallelly to each other and connected to the attaching panel; and
each panel further comprises two guide holes corresponding to and mounted around the guides of the blind.

7. The sunshade as claimed in claim 1, wherein each resilient element is a coil spring.

8. The sunshade as claimed in claim 1, wherein the retainer is a magnetic strip.

9. The sunshade as claimed in claim 1, wherein
the fasteners are suction disks, and each suction disk has a transversal hole; and
the retainer has a transversal mounting portion extending through the transversal hole of one of the suction disks.

10. The sunshade as claimed in claim 1, wherein
the fasteners are suction disks, and each suction disk has a transversal hole; and
the connectors are separately formed integrally on the cover, and each connector has a protrusion extending through the transversal hole in a corresponding suction disk.

* * * * *